(12) United States Patent
Takagi et al.

(10) Patent No.: US 7,557,539 B2
(45) Date of Patent: Jul. 7, 2009

(54) CHARGING DEVICE

(75) Inventors: Shinya Takagi, Tokyo (JP); Toshio Matsushima, Sayama (JP); Kazuo Tsukamoto, Tokyo (JP); Takuya Sudo, Tokorozawa (JP)

(73) Assignees: NTT Facilities, Inc., Tokyo (JP); Origin Electric Company, Limited, Tokyo (JP)

( * ) Notice: Subject to any disclaimer, the term of this patent is extended or adjusted under 35 U.S.C. 154(b) by 255 days.

(21) Appl. No.: 10/577,521

(22) PCT Filed: Aug. 31, 2004

(86) PCT No.: PCT/JP2004/012900

§ 371 (c)(1),
(2), (4) Date: Apr. 27, 2006

(87) PCT Pub. No.: WO2005/041383

PCT Pub. Date: May 6, 2005

(65) Prior Publication Data

US 2007/0075681 A1     Apr. 5, 2007

(30) Foreign Application Priority Data

Oct. 29, 2003   (JP)   ............................. 2003-368952

(51) Int. Cl.
*H02J 7/00*  (2006.01)
(52) U.S. Cl. .................. 320/122; 320/116; 320/118
(58) Field of Classification Search ................ 320/116, 320/118–122, 137
See application file for complete search history.

(56) References Cited

U.S. PATENT DOCUMENTS 5,602,481 A   2/1997  Fukuyama 5,998,969 A   12/1999  Tsuji et al.

(Continued)

FOREIGN PATENT DOCUMENTS

JP      7-255134      10/1995

(Continued)

OTHER PUBLICATIONS

Machine Translation for JP 09308126 A.*

(Continued)

*Primary Examiner*—Akm E Ullah
*Assistant Examiner*—Ramy Ramadan
(74) *Attorney, Agent, or Firm*—Nixon Peabody LLP (57) ABSTRACT

A charging device including an assembled battery having plural secondary batteries serially connected, a charge power source unit which supplies charging current to both ends of said assembled battery having plural secondary batteries serially connected, and plural charge controllers which connect to both ends of each secondary battery among said plural secondary batteries; wherein said charge power source unit includes a charging current output unit which outputs charging current to said assembled battery, and a control unit which controls the current of said charging current output unit based on notification of the bypass current from said charge controllers; and wherein each of said plural charge controllers includes a current control unit which bypasses the current that flows to said secondary battery when the terminal voltage of said secondary battery has reached a preset voltage value, and a notification unit which notifies the control unit of said charge power source unit of said bypass current.

5 Claims, 6 Drawing Sheets

U.S. PATENT DOCUMENTS 6,150,795 A * 11/2000 Kutkut et al. ............... 320/118

FOREIGN PATENT DOCUMENTS

| JP | 07-322492 | 12/1995 |
| JP | 08-154343 | 6/1996 |
| JP | 09-308126 | 11/1997 |
| JP | 09308126 A * | 11/1997 |
| JP | 10-191574 | 7/1998 |
| JP | 10-322925 | 12/1998 |
| JP | 2002-118983 | 4/2002 |
| JP | 2003-157908 | 5/2003 |
| KR | 1997-0013560 | 3/1997 |

OTHER PUBLICATIONS

Office Action from the Japanese Intellectual Property Office, "Notice of Reasons for Rejection," dated Apr. 11, 2006, for Japanese Application No. JP2003-368952.

* cited by examiner

CHARGING DEVICE

CROSS-REFERENCE TO RELATED APPLICATION

This application claims priority based on International Patent Application No. PCT/JP2004/012900, entitled "CHARGING DEVICE" by Shinya TAKAGI, Toshio MATSUSHIMA, Kazuo TSUKAMOTO, and Takuya SUDO, which claims priority of Japanese Application No. 2003-368952, filed on Oct. 29, 2003, and which was not published in English.

Priority is claimed on Japanese Patent Application No. 2003-368952, filed Oct. 29, 2003, the content of which is incorporated herein by reference.

TECHNICAL FIELD

The present invention relates to a charging device for secondary batteries that performs well balanced charging of each secondary battery in an assembled battery having plural secondary batteries serially connected.

BACKGROUND ART

In various applications beginning with back-up power sources and the like for communication apparatuses, plural secondary batteries are serially connected and used as assembled batteries. However, even just after manufacture of secondary batteries, variations exist in the properties of the individual batteries. Such variations grow as the duration of service lengthens and as battery deterioration progresses, and are manifested in voltage disparities or the like.

In recent years, demands have grown for increasingly compact and lightweight secondary batteries in power systems, and there is a trend toward the use of lithium ion batteries with high energy density. These lithium ion secondary batteries are used with settings where the charging voltage per lithium ion battery is 4.1V to 4.2V, and the discharge cut-off voltage is 2.9V to 3.0V. This is because, when charging is performed at high voltage and discharge is performed at low voltage, the electrode material and electrolytes forming the secondary battery undergo chemical reaction, and secondary-battery performance declines. Accordingly, it is necessary to strictly set the discharge cut-off voltage and charge cut-off voltage of lithium ion secondary batteries. However, with lithium ion secondary batteries, the phenomenon is observed in which variations in the terminal voltages of the respective batteries tend to occur when serially connected assembled batteries are constituted, and that these voltage variations gradually grow once the variations have occurred. As this phenomenon progresses, it greatly affects on the life of each battery and the discharge performance of the assembled battery.

On the other hand, when assembled batteries are incorporated into power systems and used, it is necessary to maintain the capacity of the assembled battery, and various charging methods are adopted that take into account the properties of the secondary batteries and the configuration of the power system. In direct-current power sources for communications, lead-acid secondary batteries are primarily used, and the constant-current constant-voltage charging method is adopted. In this method, the load and the secondary battery are connected in parallel to the rectifier output. Consequently, it is possible to instantaneously switch secondary battery discharge at times of rectifier malfunction or power outage of commercial power sources. Additionally, after recovery from a power outage, there are the advantages that it is possible to supply power to the load while performing storage-battery charging, and that it is basically possible to perform capacity maintenance of the secondary battery by regulating the output voltage of the rectifier.

This constant-current constant-voltage charging method is also suited to the charging of lithium ion secondary batteries, and this battery is considered to be suited to communications applications from the standpoint of the charging method. When lithium ion secondary batteries are serially connected and used, well balanced charging can be performed if the capacities or internal resistances of all batteries are constantly identical. Yet, in reality, there exist slight variations in the capacities or internal resistances of batteries. Furthermore, even if internal properties are initially identical, the internal properties of batteries are changed by trickle charging or float charging as time passes. Consequently, in the charging of conventional secondary batteries, the method has been adopted where means of measuring individual battery voltage are provided, warning signals are emitted when battery voltage exceeds a prescribed value, charging or discharging is prohibited, for example. Yet, with this method, there is the major drawback that the progress of charging is impeded, and battery performance cannot be fully realized.

Additionally, in assembled batteries maintained by the constant-current constant-voltage charging method, it is also conceivable that parts may be attached for suppressing the cell voltage of each battery. However, merely by the simple attachment of a cell voltage suppression part, differences will occur in the charged state of each battery when performing recuperative charging after discharge if the internal states of the respective batteries differ. As a result, under circumstances where a constant charging current is flowing, there are the problems that even if the charging of a certain battery is complete, other batteries are in the process of being charged, that the bypass current for voltage suppression is a high value, that part size is large, that the price is high, for example. Thus, this method has not reached the stage of practical use.

The present applicant has previously filed the description of Japanese Unexamined Patent Application, First Publication No. 2003-157908, as a charging device for charging assembled batteries.

DISCLOSURE OF INVENTION

The present invention was made in consideration of the aforementioned circumstances. Its object is to provide a charging device for secondary batteries where, in an assembled battery having plural secondary batteries serially connected, it is possible to suppress voltage variations among the respective secondary batteries, and to perform charging in a well balanced manner.

This invention was made in order to solve the aforementioned problems. According to a first aspect of the present invention, a charging device is provided which includes an assembled battery having plural secondary batteries serially connected, a charge power source unit which supplies charging current to both ends of said assembled battery having plural secondary batteries serially connected, and plural charge controllers which connect to both ends of each secondary battery among said plural secondary batteries; wherein said charge power source unit includes a charging current output unit which outputs charging current to said assembled battery, and a control unit which controls the current of said charging current output unit based on notification of the bypass current from said charge controllers; and wherein each of said plural charge controllers includes a current control unit which bypasses the current that flows to said secondary battery when the terminal voltage of said secondary battery has reached a preset voltage value, and a notification unit which notifies the control unit of said charge power source unit of said bypass current.

According to a second aspect of the present invention, in the aforementioned charging device, the aforementioned charging current output unit is a power source according to the constant current charging technique.

According to a third aspect of the present invention, in the aforementioned charging device, said control unit controls the output current of said charging current output unit so that the smallest current among the plural bypass currents notified from said plural charge controllers is approximately "0."

According to a fourth aspect of the present invention, in the aforementioned charging device, said control unit controls the output current of said charging current output unit so that, in the case where the plural bypass currents notified from said plural charge controllers are at or above a preset threshold bypass current value, said plural bypass currents become at or below said threshold bypass current value.

According to a fifth aspect of the present invention, in the aforementioned charging device, said notification unit provides notification of the between-terminal voltages of said secondary batteries together with said bypass currents to said control unit of said charge power source unit, and said control unit increases the output current of said charging current output unit in the case where said between-terminal voltages of said secondary batteries are lower than the presetting value.

According to a sixth aspect of the present invention, in the aforementioned charging device, said current control unit discharges said secondary batteries so that the between-terminal voltages of said secondary batteries are lowered to the prescribed voltage in the case where said between-terminal voltages of said secondary batteries were above said prescribed voltage at the start of charging.

BRIEF DESCRIPTION OF THE DRAWINGS

FIGS. 6 A-B are graphs showing the terminal voltages of secondary batteries 50-1, 50-2, ..., and 50-N in FIG. 1.

FIGS. 7 A-B are graphs showing the bypass currents of secondary batteries 50-1, 50-2, ..., and 50-N in FIG. 1.

BEST MODE FOR CARRYING OUT THE INVENTION

Suitable embodiments of the present invention are described below with reference to drawings. However, the present invention is not limited by any of the following embodiments, and, for example, the constituent elements of these embodiments may be appropriately combined.

Figure 1:
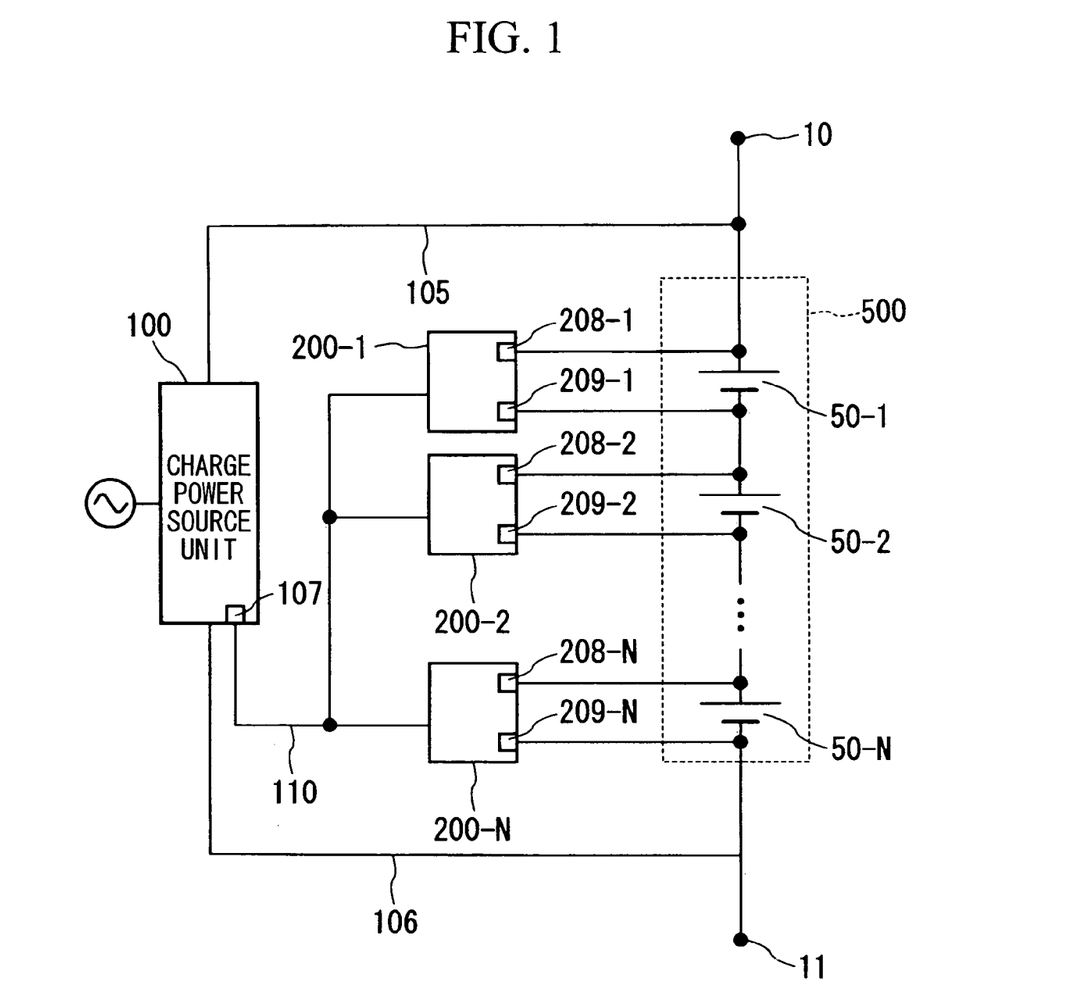
FIG. 1 is a block diagram showing the configuration of a charging device according to one embodiment of the present invention.
Figure 2:
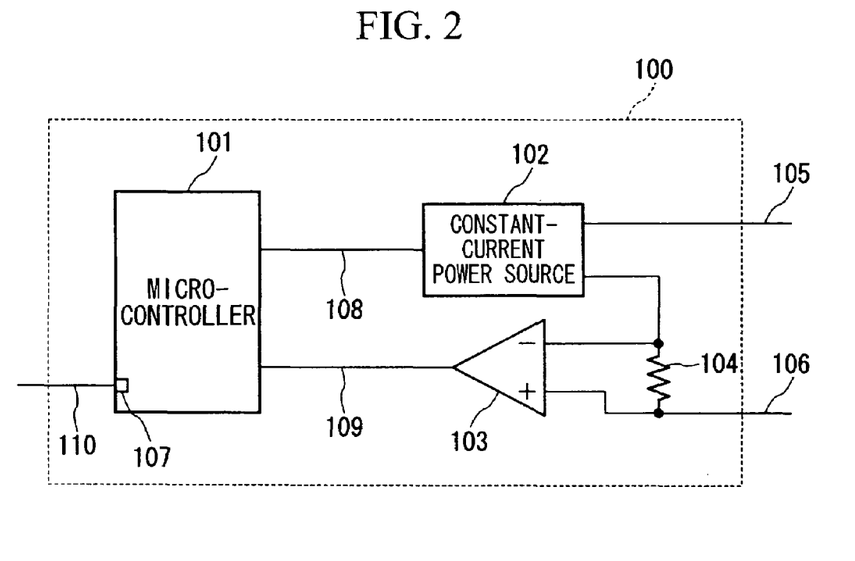
FIG. 2 is a block diagram showing the configuration of a charge power source unit 100 in FIG. 1.
Figure 3:
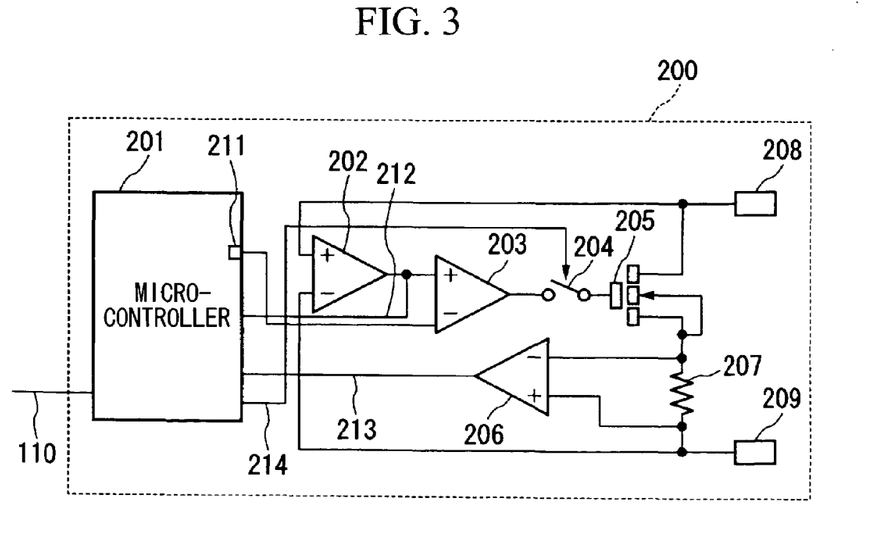
FIG. 3 is a block diagram showing the configuration of charge controllers 200-1, 200-2, ..., and 200-N in FIG. 1.
Figure 4:
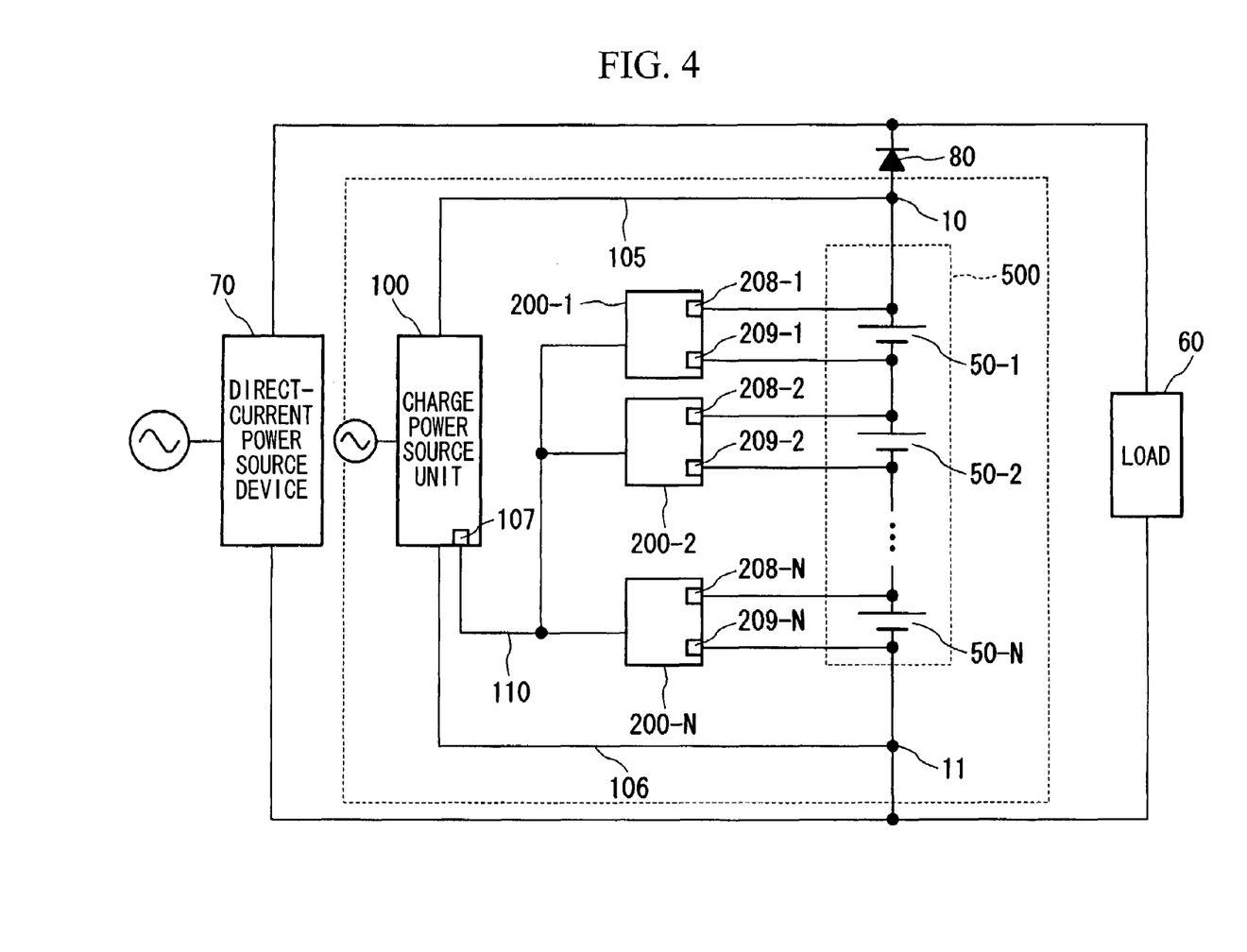
FIG. 4 is block diagram showing an example of configuration of a direct-current power supply circuit using the charging device shown in FIG. 1.
Figure 5:
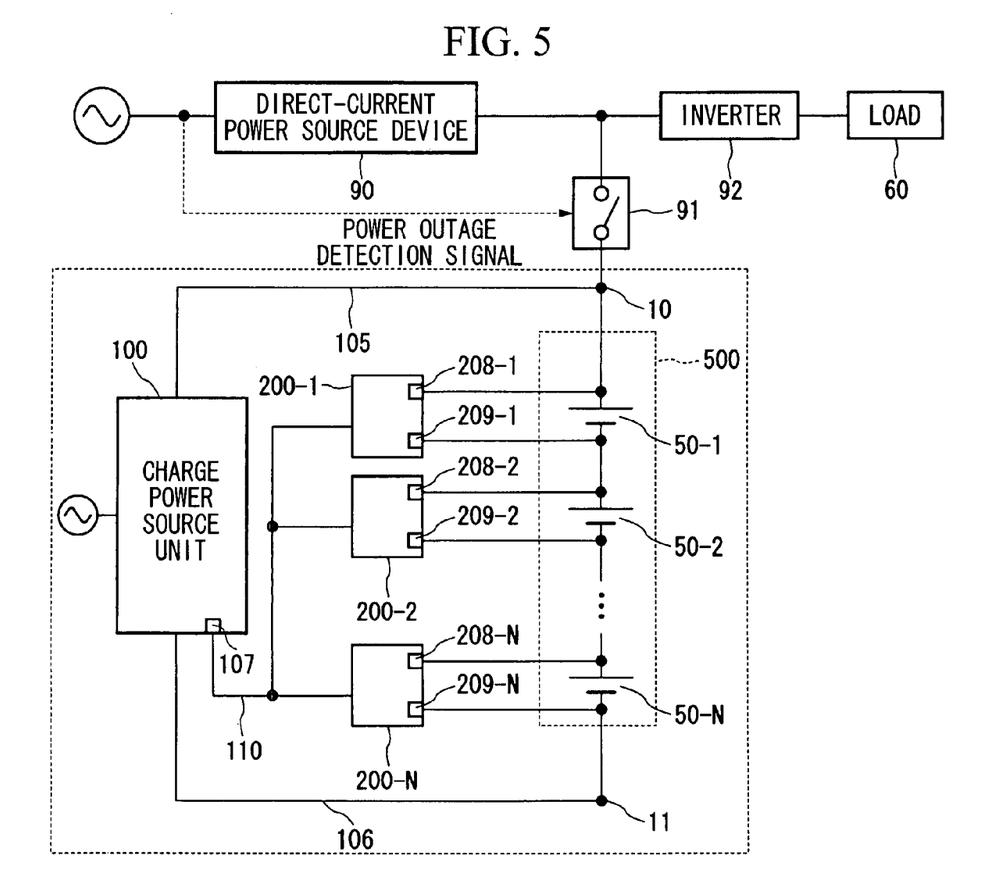
FIG. 5 is a block diagram showing an example of configuration of an alternating-current power supply circuit using the charging device shown in FIG. 1.

An embodiment of the present invention will be described as follows with reference to drawings. FIG. 1 is a block diagram showing the configuration of a charging device according to one embodiment of the present invention. FIG. 2 is a block diagram showing the configuration of a charge power source unit 100 shown in FIG. 1. FIG. 3 is a block diagram showing the configuration of charge controllers 200-1, 200-2, ..., and 200-N shown in FIG. 1. FIG. 4 and FIG. 5 are respectively block diagrams showing examples of configuration of a power source system that applies the charging device of the present embodiment. FIG. 4 is a diagram that shows a common power source system for communications that supplies direct-current power to the load, while FIG. 5 is a diagram that shows a power source system that performs uninterrupted supply of alternating-current power to equipment operated by alternating current input. Specifically, as the power source system of FIG. 5, there is UPS.

In FIG. 4, an assembled battery 500 which serially connects plural individual secondary batteries 50-1, 50-2, ..., and 50-N is connected in parallel with a load 60 on the output side of a direct current power source device 70, thereby enabling uninterrupted power supply to the load 60 even when power outages occur. A charge power source unit 100, which is a charging means for charging the secondary batteries 50-1, 50-2, ..., and 50-N, is connected to the assembled battery 500. In this case, a positive electrode charging line 105 is connected to a positive electrode terminal 10 of the assembled battery 500, while a negative electrode charging line 106 is connected to a negative electrode terminal 11 of the assembled battery 500. Charging controllers 200-1, 200-2, ..., and 200-N are respectively connected to each of the secondary batteries 50, and the outputs of the respective charge controllers 200 are all connected to the charge power source unit 100 by a communication line 110.

FIG. 5 is a power source system for alternating-current supply, where the assembled battery 500 provided with the charging device according to the present embodiment is connected to a power supply system via a direct current switch 91. Secondary battery discharge is performed from the assembled battery 500 at times of power outages or the like of commercial power sources, and uninterrupted supply is performed to the load 60 after converting to alternating current by the inverter 92.

The operation of the charging device according to the present embodiment is described below using FIG. 2 to FIG. 4.

Activation Sequence of Charging Operation

In order to commence charging operation, it is necessary for the battery voltages of all secondary batteries 50-1, 50-2, ..., and 50-N to be at voltage values that are lower than the charge cut-off voltage. Their status is obtained by transmitting initialization signals from a microcontroller 101 of the charge power source unit 100 to respective microcontrollers 201 of the respective charge controllers 200. The respective microcontrollers 201 that receive the signals first set a control stop signal 214 to stop status, and put a control switch 204 to open status. By this means, a transistor 205 is opened. In this state, the microcontroller 201 converts the differential voltage between a positive electrode input terminal 208 and a negative electrode input terminal 209 to digital information by an AD converter (not illustrated in the drawing) incorporated into the microcontroller 201 via a battery voltage detection amplifier 202, and sends it to the microcontroller 101. The microcontroller 101 that receives the voltage information extracts the maximum voltage and minimum voltage from the plural voltage information, computes the difference between the maximum voltage and minimum voltage, and commences a second-stage charging operation by skipping the battery voltage equalization process described next if it is at or below the prescribed voltage differential threshold value (e.g., 10 mV).

Battery Voltage Equalization Process

In the case where the aforementioned differential voltage of the maximum voltage and minimum voltage is at or above the aforementioned voltage differential threshold value, the microcontroller 101 transmits a minimum voltage value VS1 and an equalization signal to all of the charge controllers 200-1, 200-2, . . . , and 200-N. The respective charge controllers 200-1, 200-2, . . . , and 200-N that receive the equalization signal measure the voltage between the positive electrode input terminal 208 and negative electrode input terminal 209, and enter the measured voltage value VM1 into a register VC1 (not illustrated in the drawing) inside the microcontroller 201. The value of this register VC1 is converted to analog voltage by a DA converter, and is outputted from a terminal 211 to a negative electrode input terminal of an error amplifier 203. At this time, as a voltage identical to the measured voltage is applied on a positive electrode input terminal of the error amplifier 203, the output voltage of the error amplifier 203 is generally zero. At this point, the control stop signal 214 is changed to operational status, and the control switch 204 is set to closed status. In this state, the output of the error amplifier 203 is approximately zero, and there is almost no current flow in the current-bypass transistor 205.

Next, the microcontroller 201 minutely reduces the value of the register VC1, and continuously measures the current flowing to a shunting resistor 207 by amplifying the voltage produced in the shunting resistor 207 by a current amplifier 206, and performing conversion to digital information by an AD converter built into the microcontroller 201. The register VC1 is then controlled so that this current value does not exceed the prescribed maximum bypass current. In this operational condition, the secondary battery 50 to which the charge controller 200 is connected is in a state of discharge, and battery voltage decreases. When the voltage value shown by the register VC1 reaches the setting value VS1 sent from the microcontroller 101, reduction of the value of the register VC1 is suspended, and when the current flowing to the shunting resistor 207 is at or below the prescribed value, an equalization termination signal is sent to the microcontroller 101.

Second Stage of Charging Operation

After equalization termination signals have been transmitted from all of the charge controllers 200 to the microcontroller 101, the microcontroller 101 transmits the charge cut-off voltage and charging start signal to the respective charge controllers 200-1, 200-2, . . . , and 200-N. Next, the prescribed current value is set in the constant current power source 102. The respective microcontrollers 201 of the respective charge controllers 200 that receive the charge cut-off voltage and charging start signal set the charge cut-off voltage in the DA converter built into the microcontroller 201 as the bypass start voltage. The DA converter coverts the charge cut-off voltage to analog voltage, and outputs it to the error amplifier 203. Next, the microcontroller 201 sets the control stop signal 214 to operational status, and puts the control switch 204 to closed status. By this means, charging control operation is started.

That is, when the battery voltage of the secondary battery 50 reaches the charge cut-off voltage, an excessive rise in battery voltage is prevented by having any surplus voltage that would further increase battery voltage bypassed by the route of the transistor 205 and resistor 207. Additionally, when bypass current begins to flow in all of the charge controllers 200 to which the respective secondary batteries 50 is connected, the charging current from the charge power source unit 100 is reduced by the minimum value of these bypass currents. Furthermore, when the charging of the secondary batteries 50 approaches the full charge, the current that flows to the secondary batteries 50 and the bypass current in the charge controllers 200 both approach zero, but in the case where battery voltage is reduced by self-discharge or the like, the setting value of the constant current power source 102 that supplies charging current is again increased, and the aforementioned bypass operation is again performed. By this means, it is possible to constantly maintain the respective secondary batteries 50 in a fully charged state.

Figure 6A:
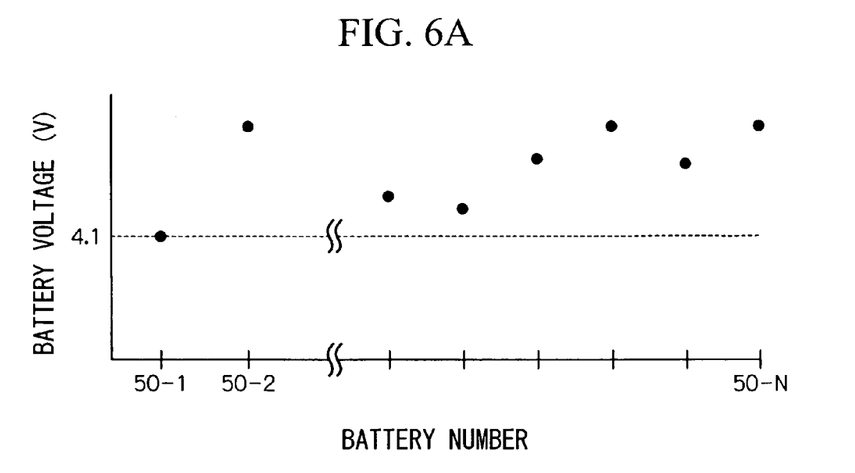
Figure 6B:
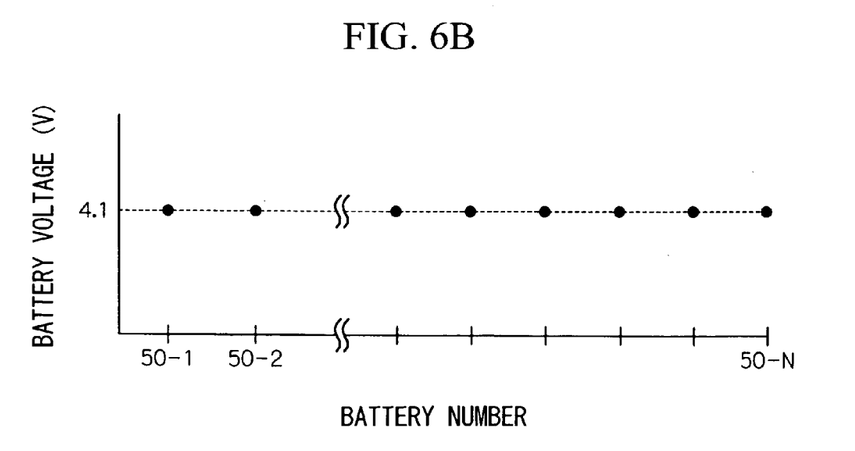

The charging control operation is described with reference to FIGS. 6A and 6B. When charging of the assembled battery 500 is performed without using the charge controllers 200, variations occur in cell voltages as shown in FIG. 6A. On the other hand, as a result of using the charge controllers 200, operation is performed so that a portion of the current flowing to the secondary battery 50 flows from the positive electrode input terminal 208 of the charge controller 200 to the negative electrode input terminal 209 (operated so that the current flowing to the secondary battery 50 is reduced) when the voltage of the secondary battery 50 nears the charge cut-off voltage, whereby the battery voltages of the secondary batteries become approximately uniform as shown in FIG. 6B. In this case, an assembled battery 500 with lithium ion secondary batteries having a single battery capacity of 1000 mAh is used, and operation is performed under the conditions where the constant current value from the charge power source unit 100 is 1 A, the charge cut-off voltage is 4.1 V, and the bypass current is a maximum of 0.5 A.

Figure 7A:
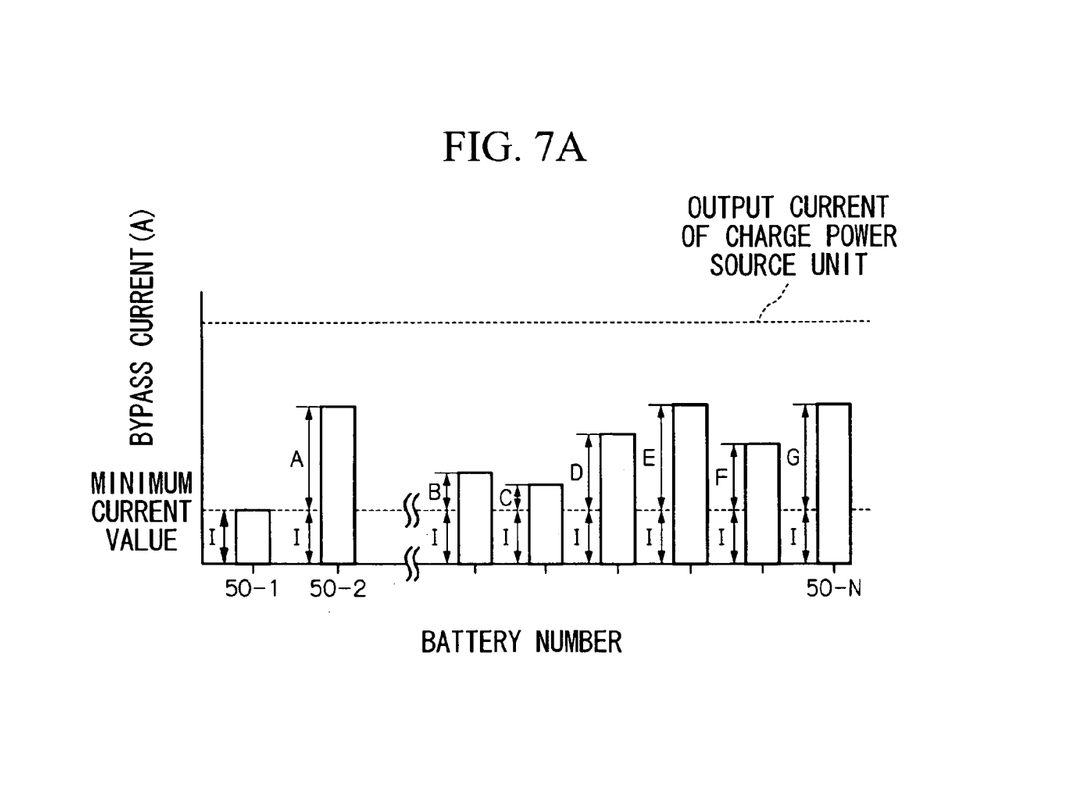
Figure 7B:
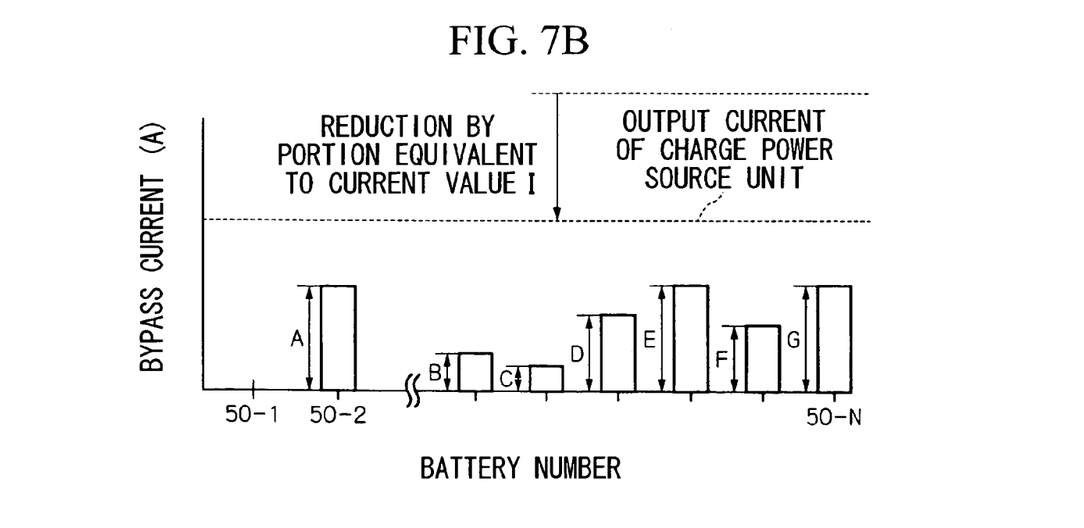

In this manner, the secondary batteries 50 that had been charged at constant current to that point enter a mode where charging is performed at constant voltage due to attenuation of the current flowing into the secondary batteries 50 when the charge cut-off voltage is neared. When charging is continued in this state without alteration, the bypass current flowing to the charge controllers 200 increases, and the greater part of the current being outputted by the constant current power source 102 flows as bypass current. When such a state occurs, a reduction in the bypass current flowing to the charge controllers 200 is effected. This situation is described with reference to FIG. 7.

In the case where secondary batteries 50 having the terminal voltages shown in FIG. 6A are serially connected, the current values for bypass to the respective charge controllers 200 connected to the respective secondary batteries 50 are as in FIG. 7A. That is, the bypass current values of each cell are the values of I for secondary battery 50-1, A+I for 50-2, . . . , and G+I for 50-N; the higher is the terminal voltage, the larger is the bypass current. The bypass current values in the plural charge controllers 200 connected to these respective secondary batteries 50 are collected in the microcontroller 101 via the communication line 110. The microcontroller 101 detects the minimum current value I of the bypass current flowing to the plural charge controllers 200, decreases the output current setting value of the constant current power source 102 by the minimum current portion I, and sets it.

By this means, the output current of the constant current power source 102 is reduced by the aforementioned minimum current value I, and the bypass currents that flow to each cell are reduced to the values of zero for secondary battery 50-1, A for 50-2, . . . G for 50-N as shown in FIG. 7B. At this time, the charging current flowing to the secondary battery 50 connected to the charge controller 200 which had the smallest bypass current is the maximum value among all cells, and as this current was the current that was truly necessary for charging of the assembled battery 500, it is automatically set as the current required for charging in the charging device according to the present embodiment. In this manner, with the present charging device, it is possible to ensure the charging current necessary for charging while automatically reducing the charging current.

In the case where the battery capacities of the respective secondary batteries 50 forming the assembled battery 500 are approximately equal, constant current charging terminates approximately simultaneously, the bypass currents that flow to all the charge controllers 200 during constant-voltage operation become identical, and the bypass currents flowing to the charge controllers 200 become a value close to approximately zero by subtracting the minimum current portion from the output current of the constant current power source 102. On the other hand, when a secondary battery 50 with less battery capacity is incorporated into the assembled battery 500, the constant current charging of that secondary battery 50 terminates early, and a gradually increasing bypass current flows to the charge controller 200 connected to that secondary battery in the interval until termination of the constant current charging of the other secondary batteries 50. In such a case, it is possible to safely proceed with charging by a protective function of the charge controllers 200 for times when the threshold bypass current value is exceeded, with which the present charging device is provided. That is, with the present device, in the aforementioned type of case, when a current amount is detected that exceeds the threshold bypass current value preset in the charge controller 200 in question, it is possible to subtract the current that exceeds the threshold value from the output current of the charge power source unit 100, regardless of the previous minimum value of the bypass current. By this means, the charge controllers 200 are protected, and it is possible to ensure the safety of a secondary battery system that applies the present embodiment. In this case, charging time tends to lengthen due to the reduction of the charging current, but it is possible to proceed with charging of the entirety of the assembled battery 500 upon suppressing the battery voltages of the respective secondary batteries 50 forming the assembled battery 500 to the prescribed charge cut-off voltage.

With secondary batteries maintained by the float charge method or trickle charge method, the battery voltage suited to maintenance of the batteries is imparted between the positive and negative electrodes of the battery, and the float (trickle) charging current required for maintenance of the capacity of the battery is made to flow. This float (trickle) charging current gradually changes according to the temperature of the batteries and their years of use, but it is possible to have a constant and stable flow of the required charging current by performing maintenance with the aforementioned kind of prescribed voltage.

The case of the present charging device differs from the imparting of a prescribed voltage between the positive and negative electrodes of the battery. However, it is possible to obtain an effect identical to the aforementioned by the function of the charge controller 200 connected to the respective secondary batteries 50. This is due to having the present charging device set the minimum value of the charging current of the charge power source unit 100 higher than the current values assumed under all conditions in the float charging method, and having excess current flow to the bypass circuit while supplying the charging current required according to the state of each battery 50 to the battery itself. In this manner, even with the present charging device, it is possible to supply to each secondary battery 50 with the charging current that would be supplied to each secondary battery in an assembled battery maintained by a conventional float (trickle) charging device.

The foregoing embodiment pertained to lithium ion secondary batteries, but the present invention may also be applied to other types of secondary batteries used in assembled batteries, such as sealed lead secondary batteries. In the case where other batteries are used, the setting of the charge cut-off voltage value may be adjusted according to the properties of the secondary battery that is applied. Moreover, the bypass current may also be set with reference to secondary battery capacity and the capacity of the charge controllers.

The present invention is constructed from a charge power source unit connected for use to both ends of an assembled battery of secondary batteries and from charge controllers respectively connected to each of the secondary batteries constituting the assembled battery. According to the present invention, when the terminal voltages of the secondary batteries reach a preset voltage value, the charge controller bypasses the current flowing to the secondary battery, and the charge power source unit detects the bypass currents flowing to the plural charge controllers, and controls the charging current based on the detected current, with the result that any imbalances among the secondary batteries can be easily eliminated. Moreover, according to the present invention, as the output current of the aforementioned charging current output unit is controlled so that the minimum current among the bypass currents is approximately zero, it is possible to realize more compact charge controllers, and to greatly contribute to the miniaturization of various types of power sources.

The invention claimed is:

1. A charging device comprising:
an assembled battery having plural secondary batteries serially connected;
a charge power source unit for supplying charging current to both ends of the assembled battery having said plural secondary batteries serially connected;
plural charge controllers connected to both ends of the respective secondary batteries of said plural secondary batteries,
wherein said charge power source unit comprises:
a charging current output unit for outputting charging current to said assembled battery; and
a control unit for controlling the current of said charging current output unit based on notification of bypass current from said charge controllers, and
each of said plural charge controllers comprises:
a current control unit for bypassing the current that flows to said secondary battery when the terminal voltage of said secondary battery reaches a preset voltage value; and
a notification unit for notifying the control unit of said charge power source unit of said bypass current, wherein said charge power source unit detects the bypass currents flowing to said plural charge controllers,
and wherein said control unit, when bypass current begins to flow in all of the charge controllers to which the respective secondary batteries are connected, detects the minimum current value of the bypass currents flowing to the plural charge controllers, and the charging current from the charge power source unit is reduced by the minimum value of these bypass currents.

2. The charging device according to claim 1, wherein said charging current output unit is a power source capable of delivering constant charging current.

3. The charging device according to claim 1 wherein said control unit controls an output current of said charging current output unit so that, in the case where the plural bypass currents notified from said plural charge controllers are at or above a preset threshold bypass current value, said plural bypass currents become at or below said threshold bypass current value.

4. The charging device according to claim 1 wherein said notification unit provides notification of the between-terminal voltages of said secondary batteries together with said bypass currents to said control unit of said charge power source unit, and said control unit increases the output current of said charging current output unit in the case where said between-terminal voltages of said secondary batteries are lower than a present value.

5. The charging device according to claim 1 wherein said current control unit discharges said secondary batteries so that the between-terminal voltages of said secondary batteries are lowered to said preset voltage value in the case where said between-terminal voltages of said secondary batteries were above said preset voltage value at the start of charging.

* * * * *